(12) United States Patent
Fukui et al.

(10) Patent No.: US 6,958,748 B1
(45) Date of Patent: Oct. 25, 2005

(54) TRANSPARENT BOARD WITH CONDUCTIVE MULTI-LAYER ANTIREFLECTION FILMS, TRANSPARENT TOUCH PANEL USING THIS TRANSPARENT BOARD WITH MULTI-LAYER ANTIREFLECTION FILMS, AND ELECTRONIC EQUIPMENT WITH THIS TRANSPARENT TOUCH PANEL

(75) Inventors: Toshiharu Fukui, Nara (JP); Akira Nakanishi, Osaka (JP); Hiroshi Moroi, Osaka (JP); Jun Katsuragawa, Aichi (JP)

(73) Assignees: Matsushita Electric Industrial Co., Ltd., Osaka (JP); Nidek Co., Ltd., Aichi (JP)

( * ) Notice: Subject to any disclaimer, the term of this patent is extended or adjusted under 35 U.S.C. 154(b) by 0 days.

(21) Appl. No.: 09/980,814

(22) PCT Filed: Apr. 20, 2000

(86) PCT No.: PCT/JP00/02594

§ 371 (c)(1),
(2), (4) Date: Apr. 1, 2002

(87) PCT Pub. No.: WO00/63924

PCT Pub. Date: Oct. 26, 2000

(30) Foreign Application Priority Data

| Apr. 20, 1999 | (JP) | ................................. 11/112830 |
| May 19, 1999 | (JP) | ................................. 11/139240 |
| Feb. 29, 2000 | (JP) | ................................. 2000/53642 |

(51) Int. Cl.$^7$ ............................................. G09G 5/00
(52) U.S. Cl. ................... 345/173; 345/206; 178/18.01; 257/437

(58) Field of Search ................................. 345/173, 174, 345/175, 176, 177, 178; 178/18.01, 18.1; 428/212; 257/437; 427/164, 165

(56) References Cited

U.S. PATENT DOCUMENTS

| 4,581,280 | A | * | 4/1986 | Taguchi et al. ............. 428/212 |
| 4,710,433 | A | * | 12/1987 | Rowe et al. ................ 428/623 |
| 5,925,438 | A | * | 7/1999 | Ota et al. ................... 428/141 |
| 5,993,898 | A | * | 11/1999 | Nagatsuka .................. 427/162 |
| 6,329,044 | B1 | * | 12/2001 | Inoue et al. ................ 428/209 |
| 6,337,771 | B1 | * | 1/2002 | Chu et al. ................... 359/586 |
| 6,352,761 | B1 | * | 3/2002 | Hebrink et al. ............. 428/212 |
| 6,590,622 | B1 | * | 7/2003 | Nakanishi et al. ............ 349/12 |
| 6,629,833 | B1 | * | 10/2003 | Ohya et al. ................. 425/458 |
| 6,657,271 | B2 | * | 12/2003 | Katsuragawa ............... 257/437 |
| 6,727,566 | B1 | * | 4/2004 | Fukui et al. ................ 257/437 |
| 2002/0197824 | A1 | * | 12/2002 | Katsuragawa ............... 438/437 |

(Continued)

FOREIGN PATENT DOCUMENTS

JP              57-139702           8/1982

(Continued)

Primary Examiner—Xiao Wu
(74) Attorney, Agent, or Firm—Dellett & Walters (57) ABSTRACT

With objectives of providing a transparent board with conductive multi-layer antireflection, under condition of high transmissivity not only on a glass substrate but also on a non-glass transparent substrate with property of conductivity and demanded resistance at most exterior surface, laminating at least three layer thin films on a transparent substrate provides with an effect of high transmissivity by suppressing reflection from interference of optical waves, in which the transparent first dielectric layer thin film on the substrate that has a higher refractive index than the substrate has, the transparent second dielectric layer thin film next to the first-layer film that has a lower refractive index than the substrate has, and the most exterior transparent third conductive-layer thin film.

34 Claims, 8 Drawing Sheets

U.S. PATENT DOCUMENTS

2004/0017363 A1 * 1/2004 Nakanishi et al. .......... 345/173

FOREIGN PATENT DOCUMENTS

| | | |
|---|---|---|
| JP | 61-159602 | 7/1986 |
| JP | 63-265625 | 11/1988 |
| JP | 5-114329 | 5/1993 |
| JP | 6-316442 | 11/1994 |
| JP | 10-114008 | 6/1998 |
| JP | 10-186104 | 7/1998 |
| JP | 10-301099 | 11/1998 |
| JP | 11-286066 | 10/1999 |

* cited by examiner

TRANSPARENT BOARD WITH CONDUCTIVE MULTI-LAYER ANTIREFLECTION FILMS, TRANSPARENT TOUCH PANEL USING THIS TRANSPARENT BOARD WITH MULTI-LAYER ANTIREFLECTION FILMS, AND ELECTRONIC EQUIPMENT WITH THIS TRANSPARENT TOUCH PANEL

FIELD OF THE INVENTION

The present invention relates to a transparent board with conductive multi-layer antireflection films, in further details, relates to a transparent touch panel using this transparent board with multi-layer antireflection films and electronic equipment with this transparent touch panel.

BACKGROUND OF THE INVENTION

At present, it is known that electrodes for photoelectric transducers such as solar batteries, displaying devices of liquid crystals, and electrodes for touch panels are made using a transparent conductive film of indium tin oxide (ITO: $In_2O_3+SnO2$) or tin oxide ($SnO_2$) formed on a transparent substrate such as glass. Especially for use in liquid crystal or electrodes for touch panels, high transmissivity in visible wavelength and optimum surface resistance are demanded. Many studies are made using the glass substrates and resulted in many inventions of multi-layer films that present high transmissivity and optimum surface resistance. However, the glass substrate has a drawback of fragility and big weight, therefore light and no fragile transparent plastic substrate is recently used to form the multi-layer films.

However, the plastic substrate presents low transmissivity since the plastic material is intrinsically less transparent than the glass and the same multi-layer films as on the glass show lower transmissivity than those on the glass. Some trials to improve transmissivity are made by reducing thickness of the conductive film, which is restricted to maintain the demanded resistance. Therefore the plastic base still showed difficulty for the transmissivity in comparison with glass base.

Again, although multi-layer films with antireflection coating of transparent dielectric thin films are effective to improve transmissivity, the coating on the most exterior surface reduces the conductivity of the surface. It may not be used as the electrode board for the liquid crystals.

In order to overcome this difficulty, efforts are paid to reduce the view sense reflection index by 0.1% steps. Publication of Japanese Laid-Open Patent Application (Tokukai Hei6-316442/1994) published a proposal that antireflection films presents high transmissivity while the most exterior surface is covered with conductive film. This invention says that the thickness of the first-layer film is controlled to be $\lambda/4$ and the summation of the thickness of the second- and the third-layer films is also controlled to be $\lambda/4$, which results in high transmission. This idea has drawback that the thickness of the second layer is restricted by the thickness of the third-layer, which may prevent high transmissivity.

The present invention, considering the former technical difficulties, has objectives to provide a highly transparent baseboard with multi-layer antireflection films under condition of high transmissivity not only on a glass substrate but also on a non-glass transparent substrate with property of conductivity and proper resistance at most exterior surface, transparent touch panel using the transparent baseboard including multi-layer antireflection films, and electronic equipment using this transparent touch panel.

SUMMARY OF THE INVENTION

To solve the problems above described, the present invention is to offer a transparent electrically conductive baseboard with antireflection multi-layer transparent films on a transparent substrate that are first, second and third-layer thin films with thickness optically considering the refraction index of the substrate, while the transparent substrate has a refraction index ranging from 1.48 through 1.70 and the first transparent dielectric film on the substrate has the higher refraction index ranging from 1.50 through 2.50 and the second film has the lower refraction index ranging 1.35 through 1.60 and the most exterior third transparent film has electrical conductivity. The present invention provides high transmission by reducing the optical waves interference with the described multi-layer thin films.

Furthermore, to solve the problems above described, the present invention is to offer a transparent touch panel including a transparent fix board with the third conductive layer and a transparent flexible board with the third conductive layer situated separately from the fix board that are electrically connected to an external circuit at the third layer of conductive transparent film, whose first transparent film layer has refraction index of 1.50 through 2.50 which is higher than the selected transparent fix substrate and/or flexible transparent substrate, and the second layer has refraction index of 1.35 through 1.60 which is lower than the selected transparent fix substrate and/or flexible transparent substrate. The present invention provides high transmission by reducing the optical waves interference with the described multi-layer thin films.

DESCRIPTION OF THE PREFERRED EMBODIMENT

Embodiment 1

Conductive multi-layer antireflection films in Embodiment 1 is explained in the following using the figures.

Figure 1:
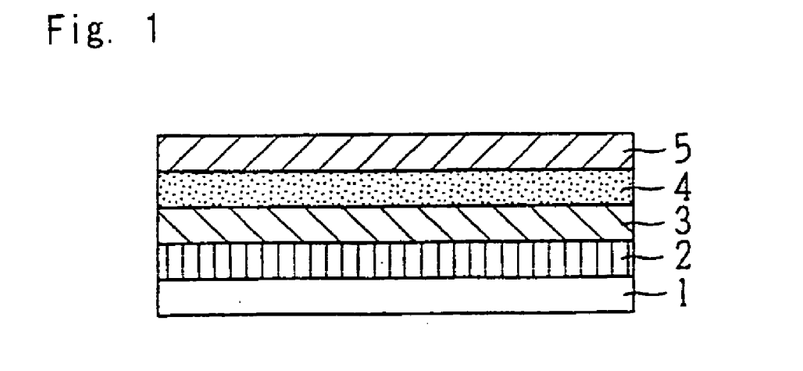
FIG. 1 is an outline cross section of the configuration of thin films.

FIG. 1 is an outline of the idea to configure conductive multi-layer antireflection films in Embodiment 1.

1 is the transparent substrate. The substrate 1 is sufficient at ordinary obtainable quality with refraction index ranging from 1.48 through 1.7. For example, optically transparent substrates are available such as glass with refraction index 1.48–1.70, polycarbonate with refraction index 1.59, polyethylene terephthalate with refraction index 1.66.

2 is a thin film on the substrate 1 that is formed before multi-layer thin films are laid. This thin film 2 is coated before laying multi-layer thin films in order to harden the surface of the substrate 1 for protection against scratches and the like, and to make the multi-layer thin films stick closely on the substrate 1, which is called "undercoat" in the following. Generally, the undercoat adopts a hard coat that enables surface protection and close stick to the substrate 1.

Alternatively, directly laying the multi-layer thin films on the substrate 1 without the undercoat 2 may be possible. However, this method is not preferable considering the surface protection and close sticking. Instead of hard coat, undercoat using vacuum evaporation on the substrate 1 may be an alternative for surface protection and close stick. In any case, the thickness of the undercoat is desired not to cause optical defects. Furthermore, coating antireflection film on the back surface of the substrate 1 (opposite side of the films) may improve transmissivity.

3 is the transparent dielectric first-layer thin film that is laid on the undercoat 2 and has higher refraction index than that of substrate 1. This transparent dielectric material is properly chosen considering the substrate 1, where the refraction index of the transparent dielectric material must be higher than 1.48 of the lowest index of the substrate 1. The material whose refraction index ranges from 1.50 to 2.50 is well used under conditions of reasonable cost and stable growth of the film. For example, for main component of the first-layer film 3, listed are $ZrO_2$ with refraction index 1.9, $TiO_2$ with refraction index 2.2, $Al_2O_3$ with refraction index 1.6. The optical thickness nd (simply written "thickness" in the following) is desired to be more than 10 nm and less than 600 nm, more preferably more than 50 nm and less than 550 nm. Furthermore, considering the controllability of the thickness in the film growth, more than $\lambda/4$ is preferable and considering productivity, less than $\lambda$ is preferable. Thickness either thicker or thinner than this presents low antireflection effects.

4 is the transparent dielectric second-layer thin film that is laid on the first-layer film 3 and has lower refraction index than that of the substrate 1. The transparent dielectric material for the film 4 is properly chosen considering the substrate 1, where the refraction index of the transparent dielectric material must be lower than 1.70 of the highest index of the substrate 1. The material whose refraction index ranges from 1.35 to 1.6 is well used under conditions of reasonable cost and stable growth of the film. For example, for main component of the second-layer film 4, listed are $SiO_2$ with refraction index 1.46, $MgF_2$ with refraction index 1.38. The thickness of the second-layer film 4 is desired to be more than 10 nm and less than 600 nm, more preferably more than 50 nm and less than 550 nm. Thickness either thicker or thinner than this presents low antireflection effects.

5 is the most exterior conductive third-layer thin film laid on the second-layer film 4. The third-layer film 5 is, for example, made of ITO, $SnO_2$, and the mixture of In and Zn. The surface resistance is determined with the thickness of the third-layer film 5, that is, high resistance is obtained with thin film and low resistance with thick film. The resistance is chosen considering the application. For applications such as electro-optical devices, photo electric transducer, liquid crystal, and touch panels, the surface resistance is demanded more than 100 $\Omega/\square$ less than 5000 $\Omega/\square$, further preferably, more than 100 $\Omega/\square$ less than 1000 $\Omega/\square$. The thickness of the third-layer film 5 that corresponds the surface resistance is demanded more than 10 nm and less than 1000 nm, and further preferably more than 20 nm and less than 300 nm.

How the optimum thickness of each film is determined is shown in the following. Firstly, thickness of the most exterior surface (the third-layer film 5 here) is determined to provide the best surface resistance according to the application. Next, under condition of fixed refraction indexes of material for the first-layer film 3 and the second-layer film 4, the physical thickness of the first-layer film 3 and the second-layer film 4 is varied using the optimization algorithm.

The optimization algorithm is obtained using various optimization algorithms using merit function, for example, Adaptive Random Search method, Modified Gradient method, Monte Carlo method, and Simulated Annealing method. In Embodiment 1, the thickness of the first-layer film 3 and the second-layer film 4 is determined so that the view-sense reflection index Y of tri-stimuli is minimized taking into account the optical spectrum analysis with characteristic matrix and the equation (1).

$$\bar{y}=f(\lambda) \qquad \text{Eq.1}$$

Here, trial and error is applied and not always the minimum value is chosen. However, since the transparent board with the multi-layer antireflection films in the present invention provides excellent performance, determining thickness of the first- and second-layer films 3, 4 by using a coarse optimum value away by around 0.2 to 0.3 from the genuine optimum in the view-sense reflection index presents sufficiently good transparency in comparison with previous substrates with multi-layer antireflection films.

Examples to grow the multi-layer films above described first-, second-, and third-layer films 3, 4, 5, are listed such as thermal deposition and spattering methods as physical vapor deposition (PVD), and plating and chemical vapor deposition methods as CVD. Although all these film-growth methods are available for the present invention, vacuum evaporation or spattering whose process without high temperature is preferred to grow thin films on the plastic substrate so that the heat does not deform the plastic substrate.

In controlling the film thickness in vacuum evaporation or spattering, it is easy and practical to use photo-electrical measurement with optical film-thickness gauge on the deposition equipment. This photo-electrical measurement senses a change in brightness by casting a chopped monotone light onto a monitor glass and throwing the reflected light into the film-thickness gauge.

The brightness changes depending on the film thickness on the substrate and the reflection of the monotone light becomes maximum (minimum) when the film thickness equals $\lambda/4$. If the refraction index of the deposition film is higher than the substrate, the reflection increases and if lower, it decreases. Accordingly, controlling the film thickness at $\lambda/4$ with the film thickness gauge is so easy just to find the maximum (minimum) of the reflection.

However, the optical film thickness in the present invention is not always integer multiple of $\lambda/4$ because the thickness of the film at each layer on the substrate is optimized so that the view-sense reflection indexes in the multiple-layer films are minimized by varying the optical film thickness under condition that the most exterior transparent conductive film is determined in accordance with the application.

In addition, the refraction index of the thin film delicately depends upon the states in the deposition equipment and the heating process of the material and so the maximum (minimum) of the reflected light and the position and the time varies. Therefore, the film thickness is controlled with anticipation of maximum (minimum) of the reflected light at $\lambda/4$ following the experimental experiences if the control is tried with the film thickness below $\lambda/4$. Then, the thickness control especially of the first-layer film 3 is preferred above $\lambda/4$. Furthermore, is preferable growing optical thin films of the first-layer film 3 and the undercoat-layer film 2 altogether not less than $\lambda/4$.

Tables 1 and 2 show the optimum configurations of the film thickness in cases when the film thickness control is not considered and is considered, that is, the thickness of the first-layer film is adjusted less than $\lambda/4$, where the substrate is made of polycarbonate with refraction index 1.59 and the thickness of the ITO film is determined so that the surface resistance becomes 600 $\Omega/\square$ in Table 1 and 550 $\Omega/\square$ in Table 2.

TABLE 1

|  | $TiO_2$ | $SiO_2$ | ITO | view-sense reflection index | surface electrical resistence |
|---|---|---|---|---|---|
| not considered film thickness control | 67.5 nm | 117.7 nm | 27.5 nm | 0.58% | 600$\Omega/\square$ |
| considere film thickness control | 20.6 nm | 65 nm | 27.5 nm | 0.69% | 600$\Omega/\square$ |

TABLE 2

|  | $TiO_2$ | $SiO_2$ | ITO | view-sense reflection index | surface electrical resistence |
|---|---|---|---|---|---|
| not considered film thickness control | 65 nm | 115 nm | 30 nm | 0.63% | 550$\Omega/\square$ |
| considere film thickness control | 204 nm | 62 nm | 30 nm | 0.72% | 550$\Omega/\square$ |

As described above, the method determining optimum film thickness one by one regardless the thickness control presents a little better view-sense reflection index. However, this difference is negligible for human sensitivity. Furthermore, theoretical view-sense reflection index became less than 1%, within surface resistance range between 250 $\Omega/\square$ and 750 $\Omega/\square$ by separately optimizing the film thickness of the first-layer film 3 and the second-layer film 4. This method offers very high performance of the transparent board with multi-layer antireflection films resulting transmissivity of 90%. As Tables 1 and 2 show that view-sense reflection index is around from 0.6 through 0.7, this method seems to present advantage of reflection index by 0.5 over previous transparent board with multi-layer antireflection films.

Accordingly, this method affords allowance of view-sense reflection index by 0.2 through 0.3 and results in more capability of treatment for protecting the film surface than the conventional ones. The same effect is also obtained as Embodiment 1 above described if is adopted four-layer films altogether by inserting a film of a lower refraction index than the substrate 1 between the first-layer thin film 3 and the undercoat 2, while the thickness of the films are determined with the optimization algorithm.

Example 1

A polycarbonate hard-coated substrate with refraction index 1.59 is prepared and the surface is cleaned with supersonic washer. The substrate is set in vacuum evaporation equipment after drying, and then air is discharged. The equipment is heated up to 130 centigrade Celsius with micro heater and halogen heater until the film is fully grown on the substrate and air is leaked. The micro heater and the halogen heater both heat up the substrate. The chemical substance should be prepared for growth of the first-, the second-, and the third-layer thin films.

One hour after the heating is started, film growth is begun. The first-layer thin film on the hard-coat surface as undercoating is grown of main component $ZrO_2$ using chemical substance ($ZrO_2$ tablet, made by Optron Co., product) prepared in the equipment. The time for deposition is set 3 minutes 30 second and the film thickness is set 140 nm. Next step grows the second-layer thin film onto the first-layer film with main component of $SiO_2$ using granular $SiO_2$ by Optron Co. The duration time for deposition is 5 minutes and the film thickness is 80 nm.

Next, the third-layer thin film of main component ITO is grown using chemical substance (ITO tablet, Optron Co., product) for the third-layer film deposition. During the third-layer thin film is grown, plasma process (RF process) is applied. The thickness of the film is chosen as 35 nm.

Figure 2:
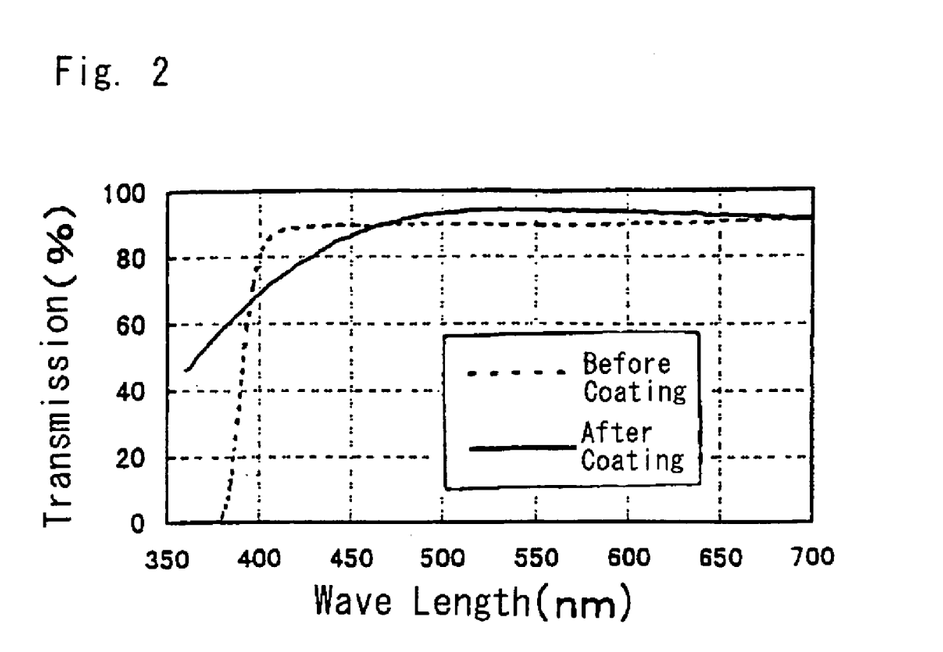
FIG. 2 is the transmission of wavelength at the film on the transparent substrate in example 1 of the present invention.
Figure 11:
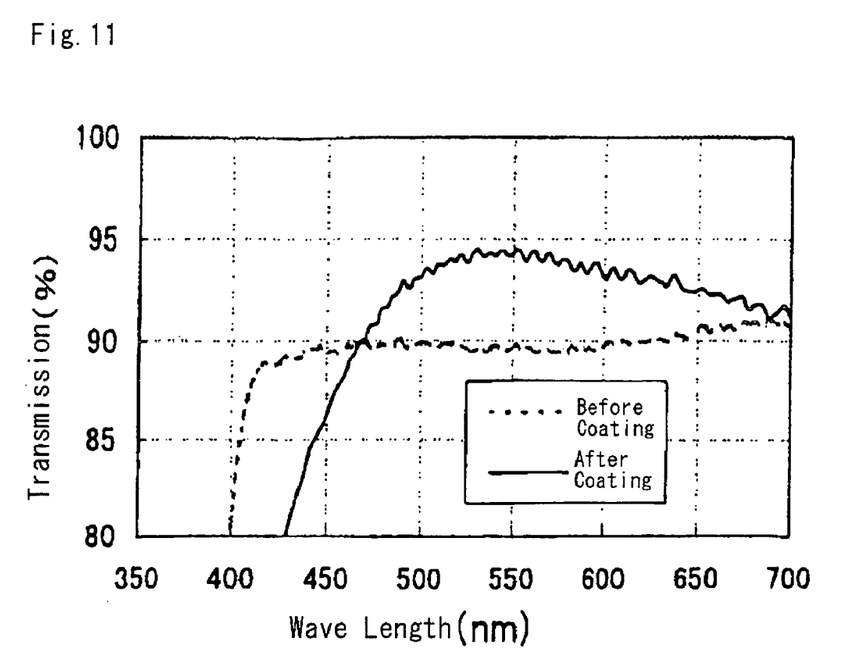
FIG. 11 is the transmission around the peak of wavelength at the film on the transparent substrate in Example 1 of the present invention.

The conductive multi-layer antireflection films obtained with above described process becomes the test sample after slow cooling. As shown in the FIGS. 2 and 11, the sample presents a peak at wavelength of 530 nm, whose transmissivity was 94.5% at 550 nm of wavelength. View-sense transmissivity gauge MODEL304 by Asahi Bunkosha showed 93.5% of view-sense transmissivity. The surface resistance was 550 $\Omega/\square$.

Example 2

Figure 3:
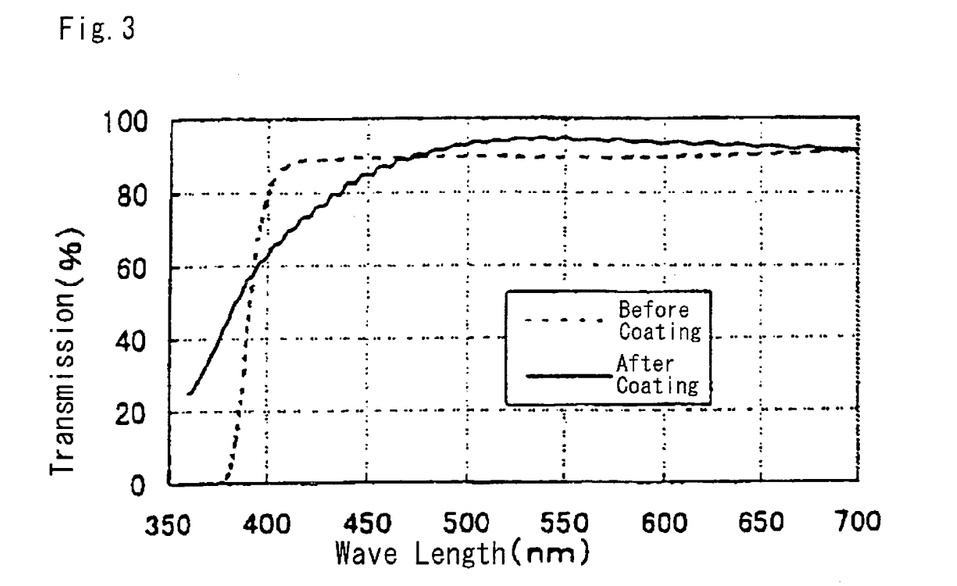
FIG. 3 is the transmission of wavelength at the film on the transparent substrate in example 2 of the present invention.
Figure 12:
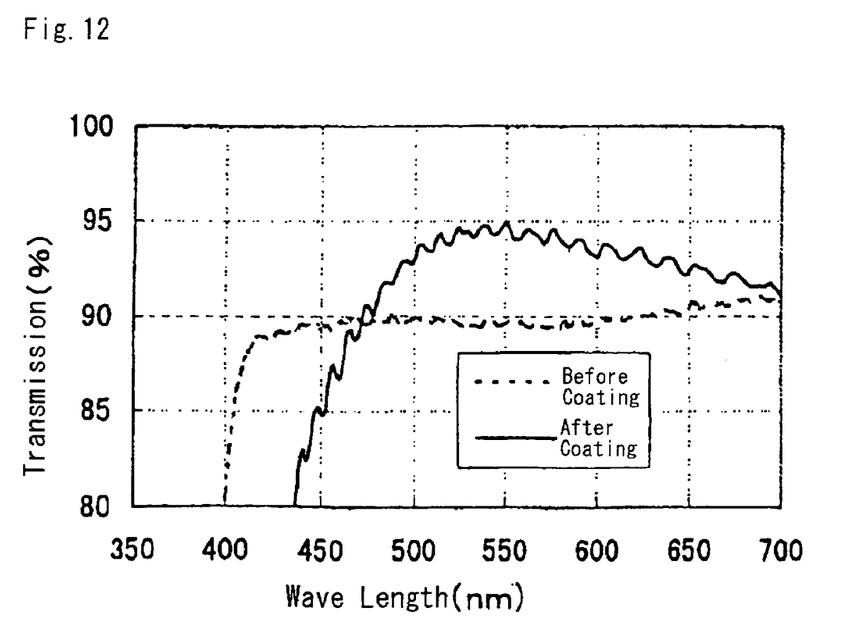
FIG. 12 is the transmission around the peak of wavelength at the film on the transparent substrate in Example 2 of the present invention.

A polycarbonate hard-coated substrate exactly the same as Example 1 is set in the vacuum evaporation equipment and the first-layer thin film of main component $TiO_2$ is grown. The time for deposition was 4 minutes and the thickness was 65 nm. Then the second-layer thin film of main component $SiO_2$ is grown with thickness of 115 nm. The third-layer thin film is grown of main component ITO with thickness of 30 nm. FIGS. 3 and 12 show the transmissivity of the conductive multi-layer antireflection films above obtained, which presents a peak at 540 nm of wavelength and 94.5% of transmissivity at 550 nm of wavelength and 93.5% of view-sense transmission. It presents 550 Ω/□ of surface resistance.

Example 3

A polycarbonate hard-coated substrate that is the same as Example 1 is set in the vacuum evaporation equipment and the first-layer thin film of main component $TiO_2$ is grown. The time for deposition was 4 minutes and the thickness was 204 nm. And the second-layer thin film of main component $SiO_2$ is grown with thickness of 62 nm. The third-layer thin film is grown of main component ITO with thickness of 30 nm.

Comparison Example 1

Figure 4:
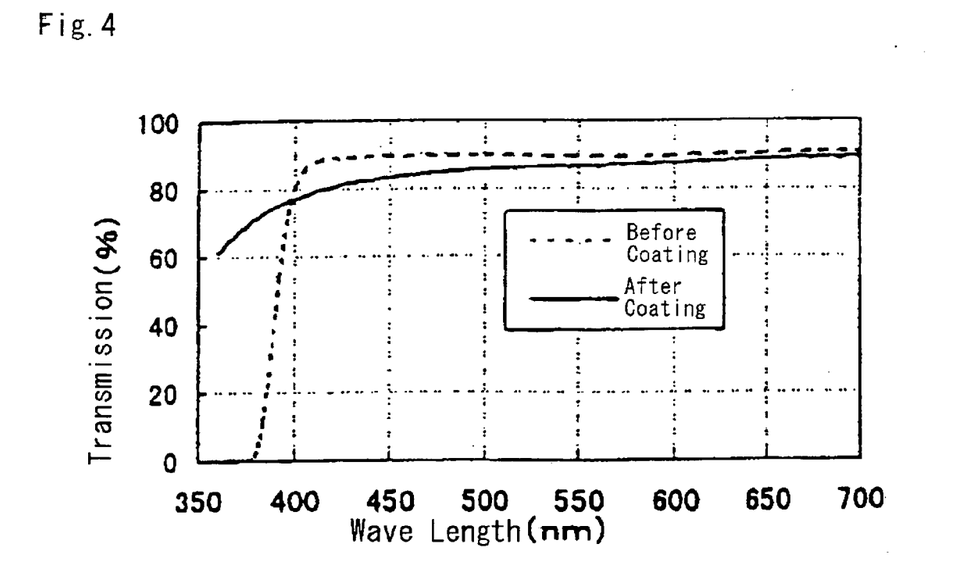
FIG. 4 is the transmission of wavelength at the film on the transparent substrate in comparison example 1 of the present invention.

A polycarbonate hard-coated substrate that is the same as Example 1 is set in the vacuum evaporation equipment and the first-layer thin film of main component TIO is grown with thickness 40 nm. FIG. 4 is the transmissivity of the conductive multi-layer antireflection films above obtained, which presents 86.6% of transmissivity at 550 nm of wavelength and 89.6% of view-sense transmissivity. It presents 550 Ω/□ of surface resistance.

Comparison Example 2

A transmissivity (theoretical value) is obtained when the same substrate as Example 1 is used, the third-layer thin film is grown of ITO with thickness 30 nm, and the first-layer thin film is grown to $\lambda/4$ ($\lambda$=500 nm), the thickness of the second- and the third-layer thin films together is controlled to be $\lambda/4$. Also, the transmissivity (theoretical value) is obtained when the same substrate as the Example 1 is used, the conductive third-layer thin film is grown as the same, and the thickness of the first- and the second-layer thin films is determined with optimization algorithm.

Figure 13:
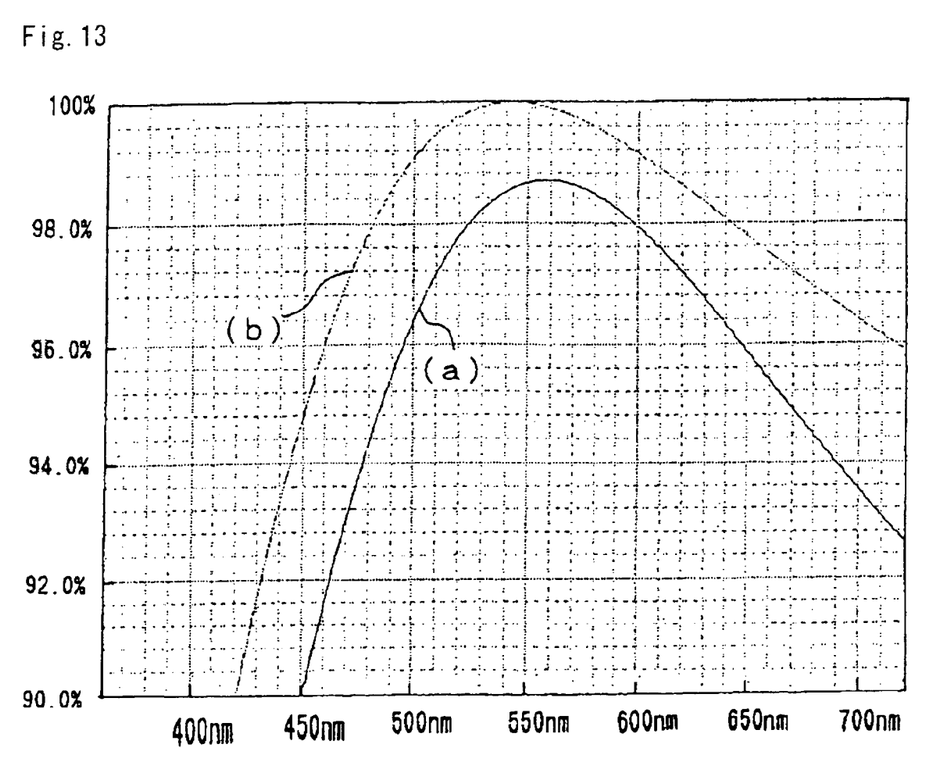
FIG. 13 is the transmission around the peak of wavelength at the film on the transparent substrate in Comparison Example 2 of the present invention.

The results are shown in FIG. 13. Curve (a) shows the index at the film thickness of $\lambda/4$, curve (b) shows the index with the optimization algorithm. The thickness of the first-layer thin film of $TiO_2$ is 125 nm in curve (a) and 65 nm in curve (b) respectively. The thickness of the second-layer thin film of $SiO_2$ is 95 nm in curve (a) and 115 nm in curve (b) respectively.

As shown above, despite the change in the main chemical components for the thin films, the layer configuration in the present invention achieved 94.5% of transmissivity at 550 nm of wavelength under condition of 550 Ω/□ of surface resistance. This is outstanding performance of transmissivity when the plastic substrate is used that is less transparent than the glass substrate. On the other hand, Comparison Example 1 that adopts different layer configuration out of Examples 1, 2, and 3, presented rather poor transmissivity of 86.6% at 550 nm of wavelength.

Generally, it is known analytically and by experiences that the most exterior layer should be a film with low refraction index and its film thickness should be $\lambda/2$, $\lambda/4$, and so on. However, if the multi-layer films are used for touch panel or the like, conductivity is essential for the most exterior layer and so the thickness is restricted by its applications.

The thickness of the third-layer thin film tends not to present desired transmissivity when the relation of the thickness between the second- and the third-layer thin films is restricted as shown in curve (a) in Comparison Example 2. The present invention does not restrict the thickness of each layer film at $\lambda/2$, $\lambda/4$, or the like, but configures multi-layer films by determining the thickness of each layer film using the optimization algorithm considering the allowed thickness range under condition of the refraction index of each layer and the thickness of the third-layer (most exterior) film. This configuration results in an excellent transmissivity of antireflection films than the previous.

Embodiment 2

Figure 5:
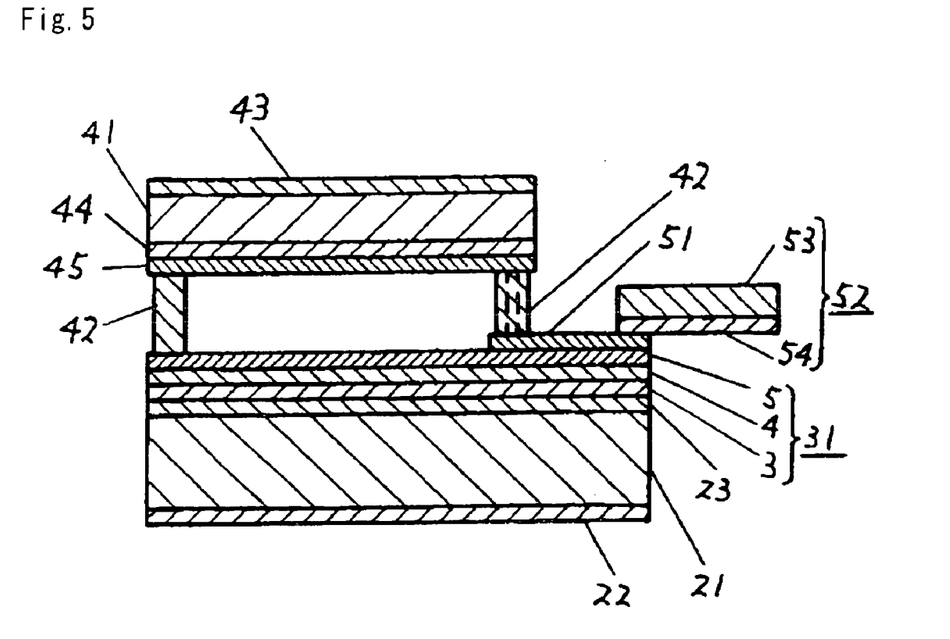
FIG. 5 is a cross section of the transparent touch panel using the transparent substrate with conductive multi-layer antireflection films in Embodiment 2 of the present invention.

In the following, the transparent touch panel that uses the transparent board with the conductive multi-layer antireflection films in Embodiment 2 is explained with reference of figures.

FIG. 5 is a section view of the transparent touch panel that uses the transparent board with the conductive multi-layer antireflection films in Embodiment 2. The very detailed explanation of the conductive multi-layer antireflection films in Embodiment 2 is omitted because it is the same as the three layered films consisting of the first-, the second-, and the third-layer thin films 3, 4, and 5 explained with FIG. 1 in Embodiment 1.

In the figure, 21 is a transparent fix substrate at the bottom side of which a hard coat layer 22 is equipped with of main component of acryl resin to prevent damage like scratches of the substrate 21 during production. For example, the chemical substance for the transparent fix substrate 21 is polycarbonate whose thickness is around 1.0 mm.

23 is the undercoat layer of main component acryl on the top surface of the transparent fix substrate 21. This undercoat 23 on the top surface of the transparent fix substrate 21 is covered before the multi-layer films are grown to harden and protect the surface of the substrate 21 from scratches, and furthermore to help closer stick of the grown antireflection film on the substrate 21. Generally, the undercoat layer 23 adopts a hard coat that enables surface protection of transparent fix substrate 21 and close stick of the multi-layer antireflection films to the substrate 21.

Alternatively, directly laying the multi-films on the fix transparent substrate 21 without the undercoat layer 23 on the fix substrate may be possible. However, as previously described, this process is not preferable considering the surface protection and closer sticking. Pre-process of undercoating a hard coat on the top surface of the transparent fix substrate 21 is preferable for the purposes described above. Instead of hard coat, simply undercoat using vacuum evaporation on the fix transparent substrate 21 may be an alternative for surface protection and closer sticking. In any case, the thickness of the undercoat is desired not to cause optical defects.

3 is a first-layer dielectric transparent thin film that is laid on the undercoat layer 23 of the transparent fix substrate. The first-layer film 3 is of higher refraction index than that of the transparent fix substrate 21. This dielectric material is properly chosen considering the fix substrate 21. The dielectric material whose refraction index ranges from 1.50 to 2.50 is well used. For example, for main component of the first film 3, listed are $ZrO_2$ with refraction index 1.9, $TiO_2$ with refraction index 2.2, $Al_2O_3$ with refraction index 1.6.

The thickness is desired to be more than 10 nm and less than 600 nm, more preferably more than 50 nm and less than 550 nm. Furthermore, considering the controllability of the thickness in the film growth, more than λ/4 is preferable and considering productivity, less than λ is preferable. Thickness either thicker or thinner than this presents low antireflection effects.

4 is a transparent dielectric second-layer film that is laid on the first-layer film 3 and has lower refraction index than that of the transparent fix substrate 21. The dielectric material for the film 4 is properly chosen considering the transparent fix substrate 21. The material whose refraction index ranges from 1.35 through 1.6 is well used. For example, for main component of the second film 4, listed are $SiO_2$ with refraction index 1.46, $MgF_2$ with refraction index 1.38. The thickness of the second-layer film 4 is desired to be more than 10 nm and less than 600 nm, more preferably more than 50 nm and less than 550 nm. Thickness either thicker or thinner than this presents low antireflection effects.

5 is a most exterior electrically conductive third-layer film laid on the second-layer 4. The third-layer film 5 is, for example, made of mainly ITO. The surface electrical resistance is determined with the thickness of the third-layer film 5, that is, high resistance is obtained with thin film and low resistance with thick film. The electrical resistance is chosen considering the applications. The surface resistance is demanded more than 100 Ω/□ less than 5000 Ω/□, further preferably, more than 100 Ω/□ less than 1000 Ω/□. The thickness of the third-layer film 5 that determines the surface resistance is demanded more than 10 nm and less than 1000 nm, and further preferably more than 20 nm and less than 300 nm. At least these thin films of the first layer 3, second-layer 4, and the third layer 5 configure the conductive antireflection films 31.

41 is a transparent flexible substrate situated separately through insulator film 42 in between against the conductive antireflection film 31, on the top surface of which is equipped with the hard coat layer 43 of mainly acryl resin with hardness of 3H pencil on the flexible substrate that protects the flexible substrate 41. For example, the chemical substance of the flexible substrate 41 is polyethylene terephthalate whose thickness is around 0.175 mm.

44 is a transparent flexible substrate-side undercoat layer made of main component acryl coated on the bottom surface of the transparent flexible substrate 41. This transparent flexible substrate-side undercoat layer 44 is configured so that it hardens the transparent flexible substrate 41 to protect it from damage like scratches and increases sticking force between the thin film and the transparent flexible substrate 41.

45 is a fourth-layer transparent dielectric thin film configured on the lowest layer of the transparent flexible substrate-side undercoat layer 44. The main component of the fourth-layer thin film is, for example, ITO. The surface electrical resistance is determined with the thickness of the fourth-layer film 45, that is, high resistance is obtained with thin film and low resistance with thick film. The electrical resistance is chosen considering the application. The surface resistance is demanded more than 100 Ω/□ and less than 5000 Ω/□, further preferably, more than 100 Ω/□ and less than 1000 Ω/□. The thickness of the fourth-layer film 45 that determines the surface resistance is demanded more than 10 nm and less than 1000 nm, and further preferably more than 20 nm and less than 300 nm.

51 is a connecting plate configured with silver paste that electrically connects the fourth-layer film 45 and the third-layer thin film 5 in conductive antireflection film 31 and also connects to an external circuit 52 that will be described later.

The external circuit 52 that is connected to the connecting plate 51 is equipped with a flexible circuit board and a desired wiring pattern.

Following is explained an operation of the above configured transparent touch panel. When the top surface of the hard coat layer 43 on the transparent flexible substrate is pushed with a pen or a finger, the pressure is transmitted to the transparent flexible substrate 41 and the conductive antireflection film 31, when the most exterior fourth-layer film 45 of the transparent flexible substrate 41 contacts the third-layer thin film 5 of the conductive antireflection film 31. This contact puts the voltage out to the external circuit 52 as the desired control signal in potential proportion with the pressed position according to the loaded voltage at the edges of the fourth-layer film 45 and the third-layer film 5.

Embodiment 3

Figure 6:
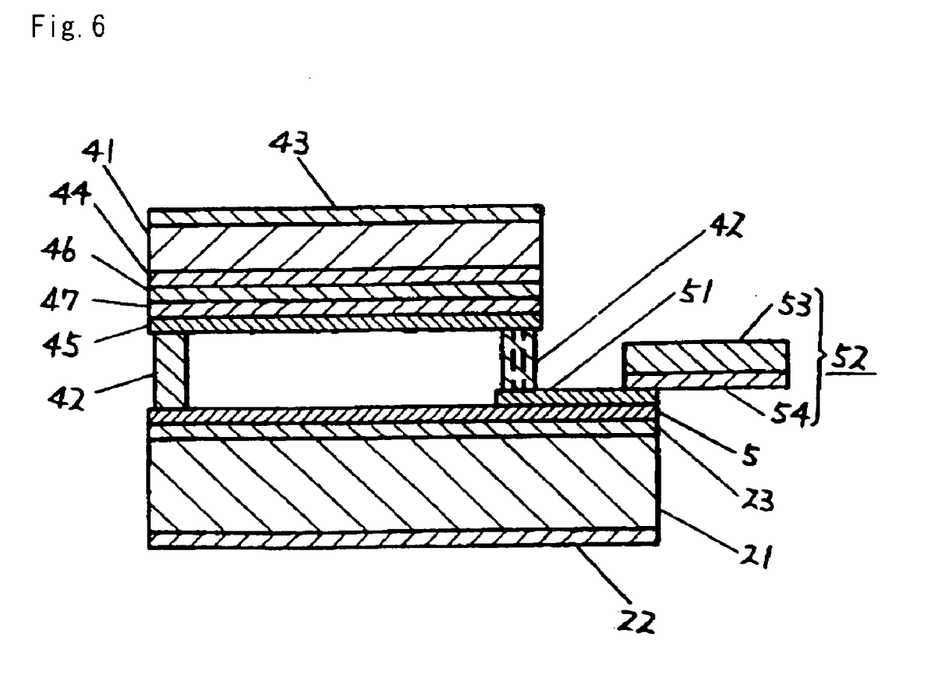
FIG. 6 is a cross section of the transparent touch panel using the transparent substrate with conductive multi-layer antireflection films in Embodiment 3 of the present invention.

In the following, is explained with references of figures a transparent touch panel that uses the conductive transparent baseboard with the antireflection multi-layer films in Embodiment 3.

FIG. 6 is a section view of the transparent touch panel that uses the conductive transparent substrate with the antireflection multi-layer films in Embodiment 3. Here, the same index numbers are allocated for the elements of the same configuration as FIG. 5 in Embodiment 2, and further detailed explanation is omitted.

In FIG. 6, 21 is a transparent fix substrate at the bottom side of which a hard coat layer 22 is equipped with of main component of acryl resin to prevent damage like scratches of the substrate 21 during production. For example, the chemical substance for the transparent fix substrate 21 is polycarbonate whose thickness is around 1.0 mm.

23 is an undercoat layer of main component acryl on the top surface of the transparent fix substrate 21. This undercoat 23 on the top surface of the transparent fix substrate 21 is covered before the multi-layer films are grown to harden and protect the surface of the substrate 21 from scratches, and furthermore help closer sticking of the grown antireflection film on the substrate 21.

5 is a most exterior electrically conductive third-layer film laid on the undercoat layer on the transparent fix substrate side. The third-layer film 5 is, for example, made of ITO. The surface electrical resistance is determined with the thickness of the third-layer film 5, that is, high resistance is obtained with thin film and low resistance with thick film. The electrical resistance is chosen considering the application. The surface resistance is demanded more than 100 Ω/□ and less than 5000 Ω/□, further preferably, more than 100 Ω/□ and less than 1000 Ω/□. The thickness of the third-layer film 5 that determines the surface resistance is demanded more than 10 nm and less than 1000 nm, and further preferably more than 20 nm and less than 300 nm.

41 is a transparent flexible substrate situated separately through insulator film 42 in between against the conductive antireflection film 31, on the top surface of which is equipped with a hard coat layer 43 of mainly acryl resin with hardness of 3H pencil on the flexible substrate that protect the flexible substrate 41. For example, the chemical substance of the flexible substrate 41 is polyethylene terephthalate whose thickness is around 0.175 mm.

44 is a transparent flexible substrate-side undercoat layer made of main component acryl plated on the bottom surface of the transparent flexible substrate 41. This transparent flexible substrate-side undercoat layer 44 is configured so that the undercoat hardens the transparent flexible substrate 41 to protect it from damage like scratches and increases sticking force between the later mentioning thin film and the transparent flexible substrate 41. Generally, the transparent flexible substrate-side undercoat layer 44 tends to adopt a hard coat that enables surface protection of the transparent flexible substrate 41 and closer stick of the multi-layer antireflection films to the transparent flexible substrate 41.

Alternatively, directly laying the antireflection multi-layer films may be possible on the transparent flexible substrate 41 without the transparent flexible substrate-side undercoat. However, as described above, this method is not preferable considering the surface protection of the antireflection multi-layer films and closer sticking. It is preferable for these reasons that the pre-undercoating on the transparent flexible substrate 41 is applied. Instead of hard coat, undercoat using vacuum evaporation on the transparent flexible substrate 41 may be an alternative for surface protection and closer sticking. Furthermore, coating an antireflection film on the back surface of the substrate may improve transmission. In any case, the thickness of the undercoat is preferred not to cause optical defects.

46 is a $6^{th}$-layer thin film of transparent dielectric with higher refraction index than that of the transparent flexible substrate 41, that is laid on the bottom surface of the transparent flexible substrate-side undercoat layer 44. The dielectric substance for the $6^{th}$-layer thin film 46 is properly chosen in accordance with the adopted transparent flexible substrate 41, within the refraction index range from 1.5 through 2.5. In practice, for the main component of the $6^{th}$-layer thin film 46 are listed $ZrO_2$ with refraction index 1.90, $TiO_2$ with refraction index 2.20, and $Al_2O_3$ with refraction index 1.60.

The thickness of the 6th-layer thin film is desired to be more than 10 nm and less than 600 nm, more preferably more than 50 nm and less than 550 nm. Furthermore, considering the controllability of the thickness in the film growth, more than $\lambda/4$ is preferable and considering productivity, less than $\lambda$ is preferable. Thickness either thicker or thinner than this presents poorer antireflection effects.

47 is a $5^{th}$-layer thin film of transparent dielectric with lower refraction index than that of the transparent flexible substrate 41, that is laid on the bottom surface of the transparent $6^{th}$-layer thin film 46. The dielectric substance for the $6^{th}$-layer thin film 46 is properly chosen in accordance with the adopted transparent flexible substrate 41, within the refraction index range from 1.35 through 1.6. In practice, for the main component of the $5^{th}$-layer thin film 47 are listed $SiO_2$ with refraction index 1.46 and $MgF_2$ with refraction index 1.38. The thickness of the $5^{th}$-layer thin film is desired to be more than 10 nm and less than 600 nm, more preferably more than 50 nm and less than 550 nm. Thickness either thicker or thinner than this presents poorer antireflection effects.

45 is a most exterior electrically conductive $4^{th}$-layer film laid on the bottom surface of the $5^{th}$-layer 47. The $4^{th}$-layer film 45 is, for example, made of main component such as ITO. The surface electrical resistance is determined with the thickness of the $4^{th}$-layer film 45, that is, high resistance is obtained with thin film and low resistance with thick film. The electrical resistance is chosen considering the application. The surface resistance is demanded more than 100 $\Omega/\square$ less than 5000 $\Omega/\square$, further preferably, more than 100 $\Omega/\square$ less than 1000 $\Omega/\square$. The thickness of the $4^{th}$-layer film 45 that determines the surface resistance is demanded more than 10 nm and less than 1000 nm, and further preferably more than 20 nm and less than 300 nm. The second conductive antireflection film 61 consists of at least the $4^{th}$, $5^{th}$, and $6^{th}$-layer thin films 45, 46, and 47 described above.

51 is a connecting plate configured with silver paste that electrically connects the fourth-layer film 45 and the third-layer thin film 5 in conductive antireflection film 31 and also connects them to an external circuit 52 that will be described later. The external circuit 52 that is connected to the connecting plate 51 is equipped with a flexible circuit board and a desired wiring pattern.

Following is explained operation of the above configured transparent touch panel. When the top surface of the hard coat layer 43 on the transparent flexible substrate is pushed with a pen or a finger, the pressure is transmitted to the second conductive antireflection film 61 and the transparent fix substrate 21, when the most exterior third-layer film 5 of the transparent fix substrate 21 contacts the $4^{th}$-layer thin film 45 of the second conductive antireflection film 61. This contact puts the voltage out to the external circuit 52 as the desired control signal in potential proportion with the pressed position according to the loaded voltages at the edges of the $4^{th}$-layer film 45 and the third-layer film 5.

Embodiment 4

Figure 7:
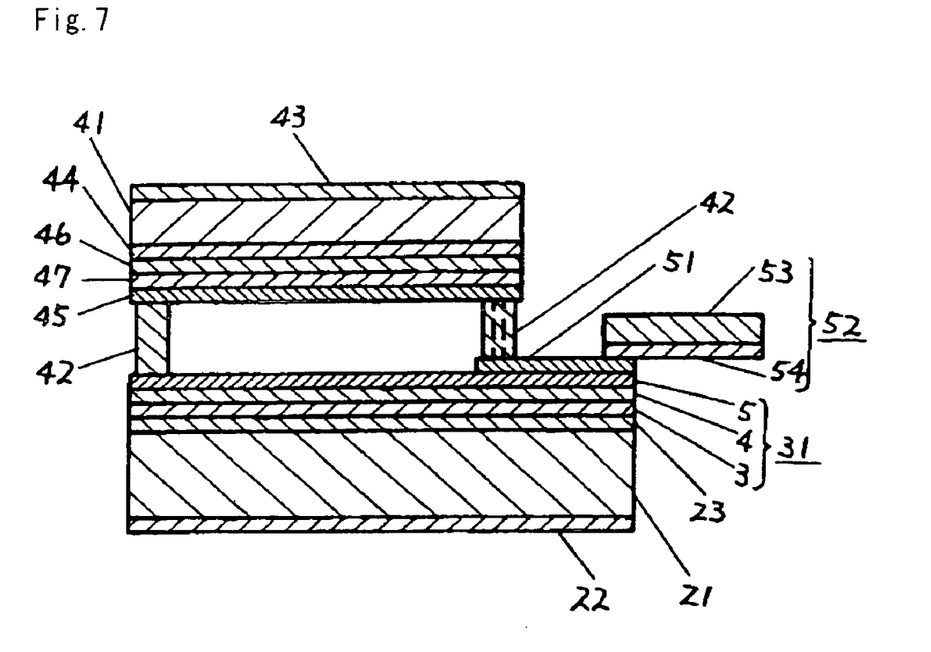
FIG. 7 is a cross section of the transparent touch panel using the transparent substrate with conductive multi-layer antireflection films in Embodiment 4 of the present invention.

In the following, with references of figures, is explained a transparent touch panel using the transparent substrate with conductive multi-layer antireflection film in Embodiment 4.

FIG. 7 is a cross section view of the transparent touch panel using the transparent substrate with the conductive multi-layer antireflection film.

The transparent touch panel in Embodiment 4 equips "the transparent flexible substrate 41" in FIG. 5 of Embodiment 2 with "the second conductive antireflection film 61" in FIG. 6 in Embodiment 3. Any other elements of Embodiment 4 are the same as in FIG. 5 of Embodiment 2.

Explanation about Embodiment 4 is restricted on the elements concerning "the transparent flexible substrate 41 set separately facing the conductive antireflection film 31 through the insulator film 42 in between," and the rest is omitted.

In FIG. 7, 41 is a transparent flexible substrate set separately facing the conductive antireflection film 31 through an insulator film 42 in between, and wears a transparent flexible substrate-side hard coat layer 43 of main component of acryl with hardness around 3H pencil to guard the surface from scratches. For example, chemical substance of the transparent flexible substrate 41 is made from polyethylene terephthalate with thickness around 0.17 mm.

44 is an undercoat layer of main component of acryl on the top surface of the transparent flexible substrate 41. This undercoat 44 on the top surface of the transparent flexible substrate 41 is covered before the multi-layer films are grown to harden and protect the surface of the substrate 41 from scratches, and furthermore help closer sticking of the grown antireflection film on the substrate 41. Generally, the undercoat layer 44 adopts a hard coat that enables surface protection of the transparent flexible substrate 41 and closer sticking of the multi-layer antireflection films to the substrate 41.

Alternatively, directly laying the multi-layer films on the flexible transparent substrate 41 without the undercoat layer 44 on the flexible substrate may be possible. However, as previously described, this method is not preferable considering the surface protection and closer sticking. Pre-process of undercoating a hard coat on the top surface of the transparent flexible substrate 41 is preferable for the purposes described above. Instead of hard coat, simple undercoat using vacuum evaporation on the flexible transparent substrate 41 may be an alternative for surface protection and closer sticking. In any case, the thickness of the undercoat is desired not to cause optical defects.

46 is a $6^{th}$-layer thin film of transparent dielectric with higher refraction index than that of the transparent flexible substrate 41, that is laid on the bottom surface of the transparent flexible substrate-side undercoat layer 44. The dielectric substance for the $6^{th}$-layer thin film 46 is properly chosen in accordance with the adopted transparent flexible substrate 41, within the refraction index range from 1.5 through 2.5. In practice, for the main component of the $6^{th}$-layer thin film 46 are listed $ZrO_2$ with refraction index 1.90, $TiO_2$ with refraction index 2.20, and $Al_2O_3$ with refraction index 1.60. The thickness of the $6^{th}$-layer thin film is desired to be more than 10 nm and less than 600 nm, more preferably more than 50 nm and less than 550 nm. Furthermore, considering the controllability of the thickness in the film growth, more than $\lambda/4$ is preferable and considering productivity, less than $\lambda$ is preferable. Thickness either thicker or thinner than this presents poorer antireflection effects.

47 is a $5^{th}$-layer thin film of transparent dielectric with lower refraction index than that of the transparent flexible substrate 41, that is laid on the bottom surface of the transparent $6^{th}$-layer thin film 46. The dielectric substance for the $6^{th}$-layer thin film 46 is properly chosen in accordance with the adopted transparent flexible substrate 41, within the refraction index range from 1.35 through 1.6. In practice, for the main component of the $5^{th}$-layer thin film 47 are listed $SiO_2$ with refraction index 1.46 and $MgF_2$ with refraction index 1.38. The thickness of the $5^{th}$-layer thin film is desired to be more than 10 nm and less than 600 nm, more preferably more than 50 nm and less than 550 nm. Thickness either thicker or thinner than this presents poorer antireflection effects.

45 is a fourth-layer of transparent dielectric film configured on the lowest layer of the transparent flexible substrate-side undercoat layer 44. The main component of the fourth-layer thin film is, for example, ITO. The surface electrical resistance is determined with the thickness of the fourth-layer film 45, that is, high resistance is obtained with thin film and low resistance with thick film. The electrical resistance is chosen considering the application. The surface resistance is demanded more than 100 $\Omega/\square$ and less than 5000 $\Omega/\square$, further preferably, more than 100 $\Omega/\square$ and less than 1000 $\Omega/\square$. The thickness of the fourth-layer film 45 that corresponds the surface resistance is demanded more than 10 nm and less than 1000 nm, and further preferably more than 20 nm and less than 300 nm. The second conductive antireflection film 61 consists of at least the $4^{th}$, $5^{th}$, and $6^{th}$-layer thin films 45, 46, and 47 as described above.

51 is a connecting plate configured with silver paste that electrically connects the fourth-layer film 45 and the third-layer thin film 5 in conductive antireflection film 31 and also connects them to an external circuit 52 that will be described later. The external circuit 52 that is connected to the connecting plate 51 is equipped with a flexible circuit board and desired wiring pattern.

Following is explained operation of the above configured transparent touch panel. When the top surface of the hard coat layer 43 on the transparent flexible substrate is pushed with a pen or a finger, the pressure is transmitted to the second conductive antireflection film 61 and the transparent fix substrate 21, when the most exterior third-layer film 5 of the transparent fix substrate 21 contacts the $4^{th}$-layer thin film 45 of the second conductive antireflection film 61. This contact puts the voltage out to the external circuit 52 as the desired control signal in potential proportion with the pressed position according to the loaded voltages at the edges of the $4^{th}$-layer film 45 and the third-layer film 5.

Embodiment 5

Figure 8:
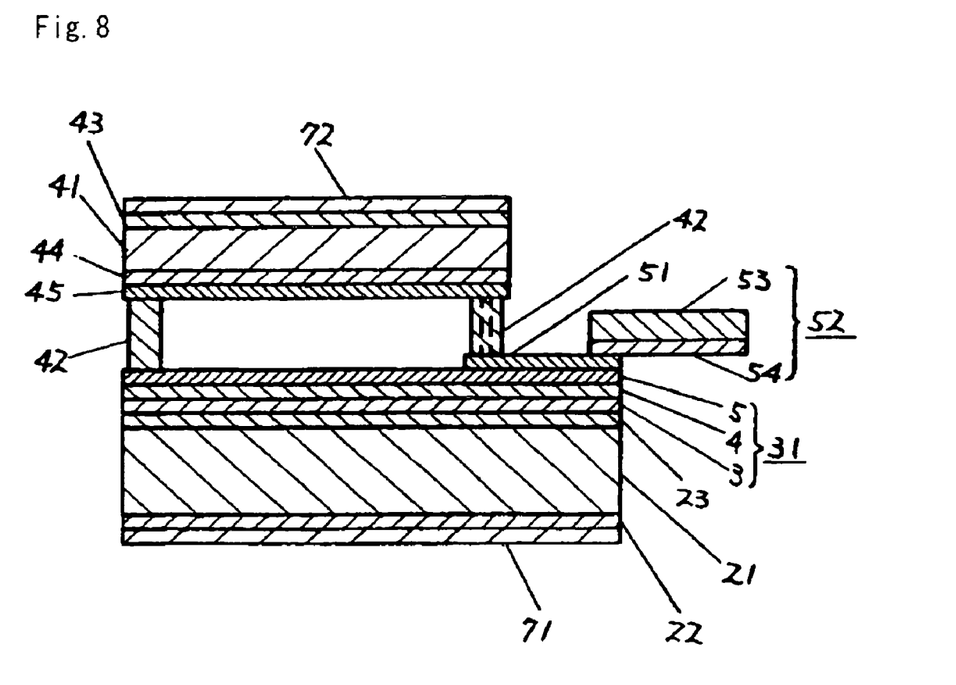
FIG. 8 is a cross section of the transparent touch panel using the transparent substrate with conductive multi-layer antireflection films in Embodiment 5 of the present invention.

In the following, with references of figures, is explained a transparent touch panel using the transparent substrate with conductive multi-layer antireflection film in Embodiment 5.

FIG. 8 is a cross section view of the transparent touch panel using the transparent substrate with conductive multi-layer antireflection film in Embodiment 5.

The transparent touch panel in Embodiment 5 equips the transparent fix-substrate-side hard-coat layer 22 and the transparent flexible-substrate-side hard-coat layer 43 with antireflection films on the surfaces of the opposite side against their substrates. Any other elements of Embodiment 5 are the same as in FIG. 5 of Embodiment 2.

The explanation for Embodiment 5 is restricted to the difference from the configuration in FIG. 5 of Embodiment 2, that is, "the transparent fix-substrate-side hard-coat layer 22 and the transparent flexible-substrate-side hard-coat layer 43 with antireflection films on the surfaces of the opposite side against their substrates," and the rest is omitted.

In the figure, 21 shows a transparent fix substrate at the bottom side of which a hard coat layer 22 is equipped of main component of acryl resin to prevent defects like scratches during production of the substrate 21. On the bottom surface of the transparent fix-substrate-side hard-coat layer 22, at opposite side against the substrate 21, the first antireflection film 71 is equipped with. The first antireflection film 71 is configured as a three-layer film by plying SiO2 and TiO2 repeatedly.

And 41 is the transparent flexible substrate, on the top surface of which is equipped a hard coat layer 43 of mainly acryl resin with hardness of 3H pencil that protects the flexible substrate 41 against scratches. On the top surface of the transparent flexible-substrate-side hard-coat layer 43, at opposite side against the transparent flexible substrate 41, the second antireflection film 72 is equipped with. The second antireflection film 72 is configured as a three-layer film by plying SiO2 and TiO2 repeatedly.

In Embodiment 5, the antireflection films are equipped with on both sides of the transparent fix substrate-side hard-coat layer 22 and the transparent flexible substrate-side hard-coat layer 43, on each opposite side against the substrate.

Embodiment 6

Figure 9:
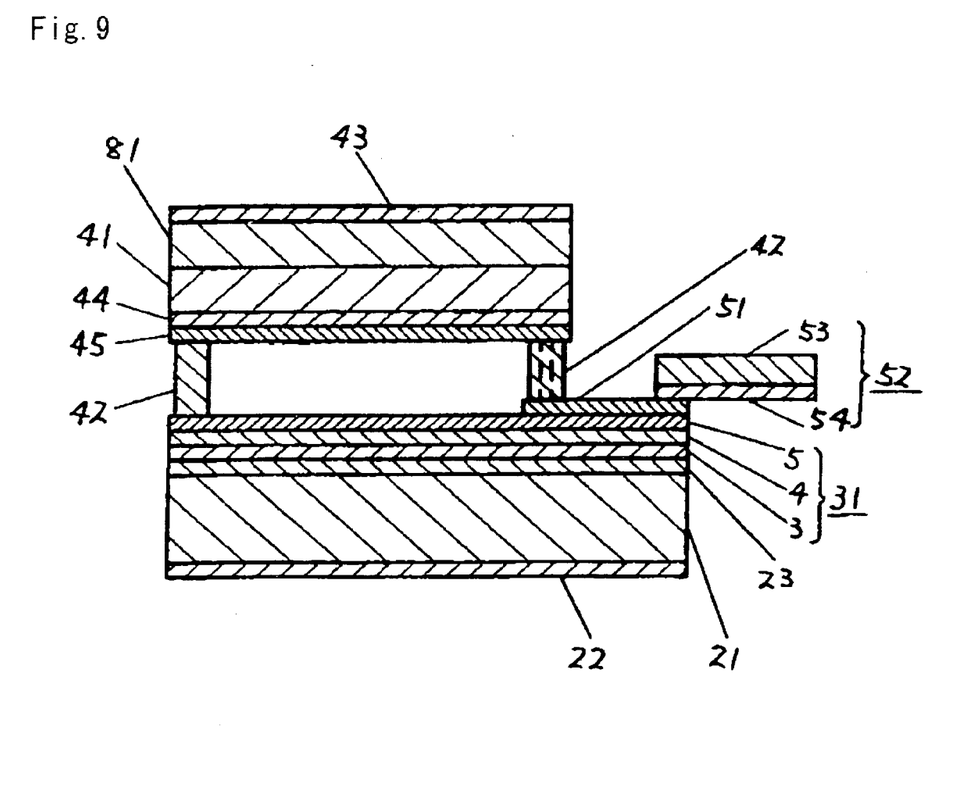
FIG. 9 is a cross section of the transparent touch panel using the transparent substrate with conductive multi-layer antireflection films in Embodiment 6 of the present invention.

In the following, with references of figures, is explained a transparent touch panel using the transparent substrate with conductive multi-layer antireflection film in Embodiment 6.

FIG. 9 is a cross section view of the transparent touch panel using the transparent substrate with conductive multi-layer antireflection film in Embodiment 6.

The transparent touch panel in Embodiment 6 equips the transparent flexible-substrate-side hard-coat layer 41 and the transparent flexible-substrate-side hard-coat layer 43 with a polarization filter film 81 in between. Any other elements of Embodiment 6 are the same as in FIG. 5 of Embodiment 2.

The explanation for Embodiment 6 is restricted to the difference from the configuration in FIG. 5 of Embodiment 2, that is, "equips the transparent flexible-substrate-side hard-coat layer 41 and the transparent flexible-substrate-side hard-coat layer 43 with a polarization filter film 81 in between," and the rest is omitted.

41 is the transparent flexible substrate consisting of cyclic olefin hydrocarbons film (JSR Arton Co. product) with property of dual refraction indexes and low diffused reflections, on the top surface of which is equipped a hard coat layer 43 of mainly acryl resin with hardness of 3H pencil that protect the flexible substrate 41. The polarization filter film 81 is equipped with between the transparent flexible-substrate-side hard-coat layer 41 and the transparent flexible-substrate-side hard-coat layer 43. The polarization filter film 81 reduces the light-beam transmission into ½ and accordingly the reflection of the transparent touch panel is reduced to less than ½.

Embodiment 7

Figure 10:
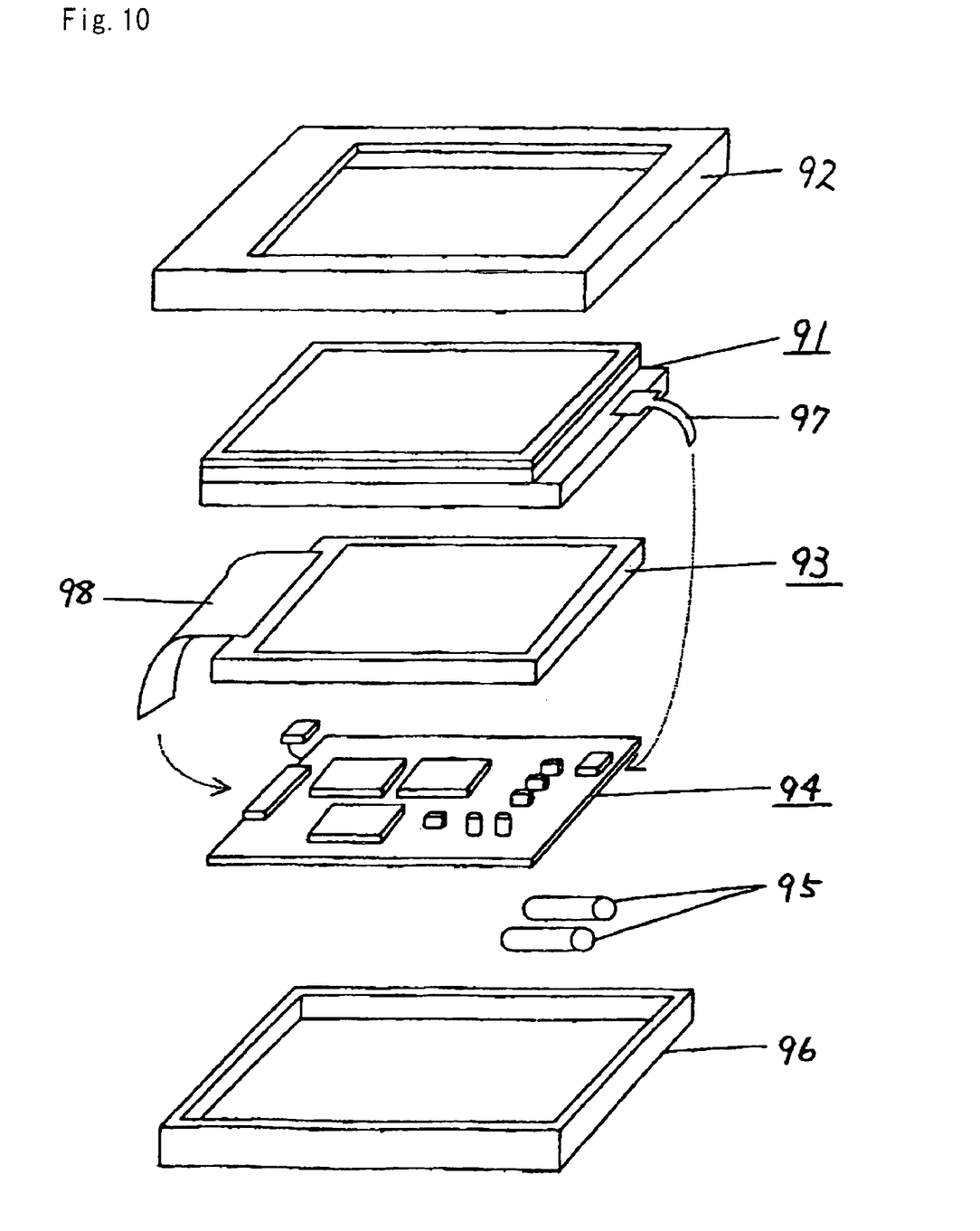
FIG. 10 is an explosive perspective of a handheld computer in Embodiment 7 of the present invention.

In the following, with references of figures, is explained electronic equipment with the transparent touch panel in Embodiment 7.

As an example of electronic equipment in Embodiment 7, a handheld computer is explained.

FIG. 10 presents an explosive perspective of a handheld computer in Embodiment 7. The transparent touch panel in Embodiment 7 is the same as those explained in FIGS. 5 through 9 in Embodiments 2–6, and the detailed explanation is not repeated. In FIG. 10, 91 is a transparent touch panel attached on the bottom surface of an upper packing case 92. 93 is a liquid crystal display arranged at the lower part of the transparent touch panel 91.

94 is a control circuit block consisting of electronic devices such as MPU and memories, arranged at the lower part of the liquid crystal display 93.

95 is a battery that feeds the control circuit block 94. These blocks are held with an upper packing case 92 and a lower packing case 96. The transparent touch panel 41 and the liquid crystal display 43 are electrically connected to the control circuit block 94 through the first and second flexible wiring circuits 97 and 98 that are drawn from the packing cases 92 and 96.

The handheld computer configured as above is operable by pushing the upper surface of the transparent touch panel 91 with a pen or a finger. The control circuit block 94 that includes CPU and memories is set to function for power On/Off, choice of the software, and execution of the software, when the liquid crystal display 93 shows each expression following the function.

APPLICATIONS IN INDUSTRY

The explanation above using references of the Embodiments showed that the transparent substrate with multi-layer antireflection films of the present invention effectively improves transmission for visible light even if a plastic substrate with high surface-reflection index is used. Accordingly, a touch panel using the present invention improves transmission for visible light and provides with better visibility and so good handling. Furthermore, the electronic equipment with a liquid crystal display using the transparent touch panel in the present invention improves visibility in showing big and complex visual volume of such as characters, drawings, pictures, and photos, in addition, offers excellent human interface by good linearity in input position and long input durability.

The invention being thus described, it will be obvious that the same may be varied in many ways. Such variations are not to be regarded as a departure from the spirit and the scope of the invention, and all such modifications as would obvious to one skilled in the art intended to be included within the scope of the following claims.

What is claimed is:

1. Transparent baseboard with conductive multi-layer antireflection films on a transparent substrate,
including the transparent substrate, a conductive third layer of transparent thin film, and transparent dielectric multi-layer thin films in between,
wherein refractive index of said substrate is between 1.48 and 1.70,
and said transparent dielectric multi-layer thin films form first- and second-layer thin films,
wherein the first layer has refractive index between 1.50 and 2.50 that is higher than said substrate,
the second layer films thin film has refractive index between 1.35 and 1.60 that is lower than said substrate,
the thickness of the conductive layer is determined with desired surface resistance,
the optical thickness of the first and the second-layer thin films satisfies the theoretical view-sense reflection index less than a proper value by varying their desired thickness taking into account refraction indexes of the substrate and the first- and the second-layer thin films, and
the optical thickness of the first-layer thin film is not $\lambda/4$ and the sum optical thickness of the second-layer thin film and the conductive layer is not $\lambda/4$.

2. The transparent baseboard with multi-layer antireflection films as defined in claim 1, in which the third-layer film has thickness determined with desired surface resistance, and the first- and the second-layer films have thickness determined to keep the theoretical reflection index less than 0.2 from the minimum at the third-layer film taking into account refraction indexes of the substrate and the first- and the second-layer films.

3. The transparent baseboard with multi-layer antireflection films as defined in claim 1, in which the thickness of the first- and the second-layer films satisfies the theoretical view-sense reflection index less than 1% by adjusting their desired thickness under condition that the thickness of the third-layer film meets the surface resistance requirement.

4. The transparent baseboard with multi-layer antireflection films as defined in claim 1, in which the thickness of the first- and the second-layer films satisfies the theoretical view-sense reflection index less than a proper value by varying their desired thickness under condition that the thickness of the third-layer film meets surface electrical resistance requirement.

5. The transparent base board with multi-layer antireflection films as defined in claim 1, in which the thickness nd of the first-layer film meets the equation $nd > \lambda/4$.

6. The transparent baseboard with multi-layer antireflection films as defined in claim 1, in which the thickness of the first-layer film ranges between 10 nm and 600 nm, that of the second-layer film ranges between 10 nm and 600 nm, that of the third-layer film ranges between 20 nm and 300 nm, and a transmission index of these films is no less than 90% at wavelength of 550 nm.

7. The transparent baseboard with multi-layer antireflection films as defined in claim 1, in which the first-layer film consists of mainly $ZrO_2$ and the second-layer film consists of mainly $SiO_2$.

8. The transparent baseboard with multi-layer antireflection films as defined in claim 1, in which a transparent dielectric thin film of lower refraction index than that of the substrate is further sandwiched between the first-layer film and the substrate.

9. The transparent baseboard with multi-layer antireflection films as defined in claim 1, in which multi-layer films consisting of at least first-, second-, and third-layer films provide surface resistance value between 100 Ω/□ and 5000 Ω/□.

10. The transparent baseboard with multi-layer antireflection films as defined in claim 1, in which thickness of the first- and the second-layer films is determined using an optimizing algorithm.

11. The transparent baseboard with multi-layer antireflection films as defined in claim 1, in which at least one side of the transparent substrate is undercoated with thickness that almost no optical defect is caused.

12. The transparent baseboard with multi-layer antireflection films as defined in claim 1, in which at least one of the first-, the second-, and the third-layer films is deposited with a vacuum evaporation method or a spattering method.

13. Transparent touch panel including
a transparent fix substrate with a third thin film of transparent dielectric,
a transparent flexible substrate with a third transparent conductive layer thin film situated away from said fix substrate,
wherein these conductive third thin films are electrically connected to external circuits,
and at least one of said transparent fix substrate or said transparent flexible substrate has a refraction index between 1.48 and 1.7,
and multiple layers of dielectric thin films are sandwiched between said transparent fix substrate or said transparent flexible substrate and said third-layer thin film,
comprising the conductive anti-reflection film formed with the manner that firstly said dielectric thin films are laid on the substrate and secondly said third thin film is laid, in which the first-layer transparent thin film has refraction index between 1.50 and 2.50 that is higher than said selected transparent fix substrate and/or flexible transparent substrate, and the second-layer transparent thin film with refraction index between 1.35 and 1.60 that is lower than said selected transparent fix substrate or flexible transparent substrate.

14. Transparent touch panel as defined in claim 13, in which a conductive antireflection film is sandwiched between the transparent fix substrate and the third-layer film, and said conductive antireflection film is made of multi-laid optical thin films that are determined considering the refraction index of the transparent fix substrate.

15. Transparent touch panel as defined in claim 13, in which a conductive antireflection film is sandwiched between the transparent flexible substrate and the third-layer film, and said conductive antireflection film is made of multi-laid optical thin films that are determined considering the refraction index of the transparent flexible substrate.

16. Transparent touch panel as defined in claim 13, in which conductive antireflection films are sandwiched between a transparent flexible substrate and third-layer films, and between transparent fix substrate and third layer-films each, and said conductive antireflection film is made of multi-laid optical thin films that are determined considering the refraction index of said transparent fix substrate.

17. Transparent touch panel as defined in claim 13, in which thickness of the thin film of conductive antireflection third layer is determined to meet the surface electrical resistance requirement, and the thin film thickness of first and second layers is determined to make the theoretical view-sense reflection index within 0.2 from the minimum at the surface of the third layer considering the indexes of the films and fix and/or flexible substrates.

18. Transparent touch panel as defined in claim 13, in which thickness of first and second thin films satisfies theoretical view-sense reflection index less than 1% when their desired thickness is varied as a variable, under condition that the third-layer thickness meets surface electrical resistance requirement.

19. Transparent touch panel as defined in claim 13, in which the thickness of first and second thin films satisfies the theoretical view-sense reflection index less than a proper value by varying their thickness as variables, under condition that the third-layer thickness meets surface electrical resistance requirement.

20. Transparent touch panel as defined in claim 13, in which the thickness nd of the first layer of said transparent anti-reflection thin film meets the equation $nd>\lambda/4$.

21. Transparent touch panel as defined in claim 13, in which the thickness of the first thin film ranges between 10 nm and 600 nm, that of the second thin film does between 10 nm and 600 nm, that of the third thin film does between 20 nm and 300 nm, and transmission of these thin films is no less than 90% at wavelength of 550 nm.

22. Transparent touch panel as defined in claim 13, in which the first-layer thin film consists of mainly $ZrO_2$ and the second-layer film consists of mainly $SiO_2$.

23. Transparent touch panel as defined in claim 13, in which between said selected transparent fix and/or flexible substrates and said first-layer thin film is further sandwiched a dielectric thin film of lower refraction index than that of said selected transparent fix and/or flexible substrates.

24. Transparent touch panel as defined in claim 13, in which at least the antireflection conductive film provides surface electrical resistance ranging between 100 Ω/□ and 5000 Ω/□.

25. Transparent touch panel as defined in claim 13, in which the thickness of the first- and the second-layer thin films is determined using an optimizing algorithm.

26. Transparent touch panel as defined in claim 13, in which at least one side of the transparent fix or flexible substrate is undercoated.

27. Transparent touch panel as defined in claim 13, in which a transparent flexible substrate consists of at least laminated 2 sheets of film with glue.

28. Transparent touch panel as defined in claim 13, in which the transparent flexible substrate is equipped with a polarized filter sheet.

29. Transparent touch panel as defined in claim 13, in which at least one side of the transparent fix or flexible substrate is coated with antireflection film.

30. Transparent touch panel as defined in claim 13, in which the transparent flexible substrate is equipped with a polarized filter sheet and with an antireflection film on the sheet.

31. Electronic equipment including a display furnished with the transparent touch panel as defined in claim 13 on the display side, and a control circuit that processes control signals obtained by pushing said transparent touch panel.

32. A method of making a transparent baseboard with conductive multi-layer antireflection films on a transparent substrate comprising the steps of:

determining the thickness of the most exterior surface to provide the best surface resistance according to the application of the transparent baseboard;

growing a first layer of anti-reflection film on the substrate in which the refractive index of the first layer is between 1.50 and 2.50, and the refractive index is higher than a refractive index of the substrate, determining a thickness of the first layer by using a coarse optimum value approximately 0.2 to 0.3 away from the genuine optimum in the view-sense reflection index; and growing a second layer of anti-reflection film on the substrate in which the refractive index of the first layer is between 1.35 and 1.60, and the refractive index is lower than the refractive index of the substrate, determining a thickness of the second layer by using a coarse optimum value approximately 0.2 to 0.3 away from the genuine optimum in the view-sense reflection index.

33. A method according to claim 32 wherein the thickness of the first-layer film 3 and the second-layer film 4 is determined so that the view-sense reflection index Y of tri-stimuli is minimized taking into account the optical spectrum analysis with characteristic matrix and the equation $\bar{y}=f(\lambda)$.

34. A method according to claim 32 wherein said step of growing a first layer, and said step of growing a second includes one of thermal deposition and spattering methods such as physical vapor deposition (PVD), and plating and chemical vapor deposition methods as CVD.

* * * * *